(12) United States Patent
Kani et al.

(10) Patent No.: US 10,946,462 B2
(45) Date of Patent: Mar. 16, 2021

(54) PORTABLE BAND SAW

(71) Applicant: MAKITA CORPORATION, Anjo (JP)

(72) Inventors: Toshiyuki Kani, Anjo (JP); Yuta Okuhira, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/447,075

(22) Filed: Jun. 20, 2019

(65) Prior Publication Data

US 2020/0001382 A1 Jan. 2, 2020

(30) Foreign Application Priority Data

Jun. 28, 2018 (JP) .............................. JP2018-123428

(51) Int. Cl.
*B23D 55/10* (2006.01)
*B23D 53/12* (2006.01)

(52) U.S. Cl.
CPC ............. *B23D 55/10* (2013.01); *B23D 53/12* (2013.01)

(58) Field of Classification Search
CPC ........ B23D 55/10; B23D 53/12; B23D 55/06; B23D 55/082; B23D 59/001; B23D 53/02; B23D 55/065; B26D 7/00; Y10T 83/7245; Y10T 83/7239; Y10T 83/7251; Y10T 83/7226; Y10T 83/263; Y10T 83/222; Y10T 83/8878; Y10T 836/95; Y10T 83/242
USPC ......... 83/818, 817, 916, 814, 578, 819, 820, 83/811, 859, 788, 169; 30/380, 390, 513
See application file for complete search history.

(56) References Cited

U.S. PATENT DOCUMENTS

| | | | | |
|---|---|---|---|---|
| 1,392,990 A | * | 10/1921 | Vaughan ................ | B23D 55/06 83/817 |
| 3,390,598 A | * | 7/1968 | Sands ..................... | B27B 13/06 83/820 |
| 4,386,545 A | * | 6/1983 | Chaconas .............. | B23D 55/06 83/814 |

(Continued)

FOREIGN PATENT DOCUMENTS

JP 2016-147339 A 8/2016

*Primary Examiner* — Ghassem Alie
(74) *Attorney, Agent, or Firm* — Oliff PLC

(57) ABSTRACT

In a band saw that is provided with a tension adjustment mechanism in which tension for an band saw blade can be adjusted, first and second wheel support shafts are provided in paired first and second wheel support portions, respectively, such that the first support shaft is parallel to the second support shaft. The first wheel support portion is configured to be movable in a direction in which a straight line extends, the straight line being perpendicular to both the first and second wheel support shafts. A first support is provided at a first end of the first wheel support portion, and a second support is provided at a second end of the first wheel support portion. Furthermore, an intermediate support is provided between the first support and the second support. A first load and a second load are configured to be applied to the second support and the intermediate support, respectively, such that the first load and the second load are parallel to the wheel support shaft and the direction of the first load is opposite to that of the second load.

20 Claims, 17 Drawing Sheets

(56) References Cited

U.S. PATENT DOCUMENTS

2010/0050846 A1* 3/2010 Liu .................. B23D 55/10
 83/811
2011/0296696 A1* 12/2011 Holly ................ B27G 19/06
 30/380

* cited by examiner

PORTABLE BAND SAW

CROSS-REFERENCE

This application claims priority to Japanese patent application serial number 2018-123428, filed on Jun. 28, 2018, the contents of which are incorporated herein by reference in its entirety.

TECHNICAL FIELD

The present invention generally relates to a portable band saw. More specifically, a portable band saw with a tension adjustment mechanism for adjusting the tension for a continuous belt-shaped band saw blade.

BACKGROUND

Various types of electric power tools may be used for cutting a workpiece, such as, for example, a wooden material or a metal material. For example, Japanese Laid-Open Publication No. 2016-147339 discloses a portable band saw that may be used for cutting a workpiece by circulating a continuous belt-shaped band saw blade. Generally, a speed at which the band saw blade travels is relatively slow for a portable band saw. Because of this feature, the scattering of sparks or generation of sound when cutting can be suppressed. Referring to FIGS. 12 to 14, a portable band saw 210 is provided with a tension adjustment mechanism 300 that includes a slide plate 310 for applying tension to a continuous belt-shaped band saw blade 215. The slide plate 310 is configured to be slid along the long holes 311, each of which is formed at one of four corners of the slide plate 310, being guided by corresponding sleeves 313 mounted to a front housing 221. Furthermore, as depicted in FIGS. 15 and 16, the slide plate 310 is slid in a manner such that the slide plate 310 is biased outward by a compression spring 360 that is compressed by pivoting a lever 350. Because of this configuration, tension can be applied to the continuous band-shaped band saw blade 215.

However, a deformation might be caused in the slide plate 310 of the above-mentioned portable band-saw 210. For example, because the long holes 311 form an opening in the four corners of the slide plate, the slide plate 310 may be deformed beyond an allowable level. As depicted in FIG. 17, the direction of the tension caused by the band saw blade 215 (a force in the inward direction) is parallel to and opposite of the force caused by the compression spring 360. However, these forces are misaligned in the up-to-down direction in FIG. 17. Because of this misalignment, a rotational force is generated. Many portions, such as, for example, the contact portions between long holes 311 and the sleeves 313 of washers 312a, are subject to the rotational force. Thus, a complex bending force may be generated in the slide plate 310. As a result, the slide plate 310 may be deformed, which sometimes causes failure in the tension adjustment mechanism 300.

Thus, as a result of at least the above mentioned deficiencies, there is a need for a portable band saw with an improved tension adjustment mechanism, which may prevent an operation failure when the tension adjustment mechanism is used.

SUMMARY

One exemplary embodiment of the present disclosure relates to a portable band saw that is provided with a tension adjustment mechanism in which tension for an endless band saw can be adjusted. First and second wheel support shafts are provided in paired first and second wheel support portion, respectively, such that the first support shaft is parallel to the second support shaft. The first wheel support portion is configured to be movable in a direction in which a straight line extends, the straight line being perpendicular to both the first and second wheel support shafts. A first support is provided at a first end of the first wheel support portion, a second support is provided at a second end of the first wheel support portion, and an intermediate support is provided between the first support and the second support. A first load and a second load are configured to be applied to the second support and the intermediate support, respectively, such that the first load and second load are parallel to the first support shaft and the direction of the first load is opposite that of the second load.

According to this embodiment, when the portable band saw is used, a rotation force in an opposite direction to the rotation direction generated in the first wheel support portion can be generated using minimal components, e.g., the second support and the intermediate support. Furthermore, a bending force that may be generated is simple, rather than complex. Therefore, a possible deformation may be simple, and thus an operation failure may not occur in the tension adjustment mechanism. Furthermore, the intermediate support may serve as a concentrated load, and thus the tension adjustment mechanism forms a load balance similar to a beam in which both ends of the beam are free ends. For example, the first wheel support portion may elastically deform such that while a maximum bending moment may be produced at the intermediate support, a bending moment may become zero at both ends. Thus, deformation may not occur at both ends of the first wheel support portion and the operation failure may not occur in tension adjustment mechanism. This can also be effectively applied to a plastic deformation.

In another exemplary embodiment of the disclosure, the intermediate support may be disposed between the first support and the first wheel support shaft.

According to this embodiment, the intermediate support is provided between the places where rotation forces are generated and thus the position of the intermediate support serves as a rotation center, Furthermore, a maximum bending moment may be generated at this position, which means that the position where the maximum bending is generated serves as the rotation center. Because of this configuration, an operation failure caused by the bending deformation can be reduced.

In another exemplary embodiment of the disclosure, the intermediate support may extend in a direction perpendicular to the direction in which the first wheel support portion moves, when viewed in a direction in which the first wheel support shaft extends. Furthermore, the intermediate support may be formed in a column shape so as to come into line-contact with the first wheel support portion.

According to this embodiment, connection resistance of the intermediate support with respect to the first wheel support portion can be reduced. Thus, operational failure that may occur in the tension adjustment mechanism can be reliably prevented.

In another exemplary embodiment of the disclosure, the intermediate support may be formed in a cylindrical shape.

According to this embodiment, the contact portion of the intermediate support formed in the cylindrical shape is not sharp and thus the resistance thereof can be furthermore reduced.

In another exemplary embodiment of the disclosure, the second support may be provided with a fine adjustment mechanism in which the first load can be fine adjusted.

According to this embodiment, fine adjustment of the inclination of the first wheel support portion can be fine adjusted. Thus, the posture of the first wheel support portion can be held in a proper manner, which achieves a cutting task in a stable and proper manner.

In another exemplary embodiment of the disclosure, the second support may be configured to contact a screw, and the first load can be fine adjusted by rotation of the screw.

According to this embodiment, the inclination of the first wheel support portion can be easily fine adjusted by the second support.

In another exemplary embodiment of the disclosure, guide members that guide a movable direction of the first wheel support portion may be provided in the vicinity of the first wheel support portion.

According to this embodiment, a movement of the first wheel support portion in a direction perpendicular to the direction in which the first wheel support portion extends can be reduced. Thus, deformation of the first wheel support portion can be prevented and a smooth adjustment can be achieved.

In another exemplary embodiment of the disclosure, the guide members may be ribs, each of which faces each other and holds the first wheel support portion.

According to this embodiment, movement of the wheel support portion can be guided in an exact and easy manner.

DETAILED DESCRIPTION

The detailed description set forth below, when considered with the appended drawings, is intended to be a description of exemplary embodiments of the present invention and is not intended to be restrictive and/or represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of this disclosure. It will be apparent to those skilled in the art that the exemplary embodiments of this disclosure may be practiced without these specific details. In some instances, these specific details refer to well-known structures, components, and/or devices that are shown in block diagram form in order to avoid obscuring significant aspects of the exemplary embodiments presented herein.

Figure 1:
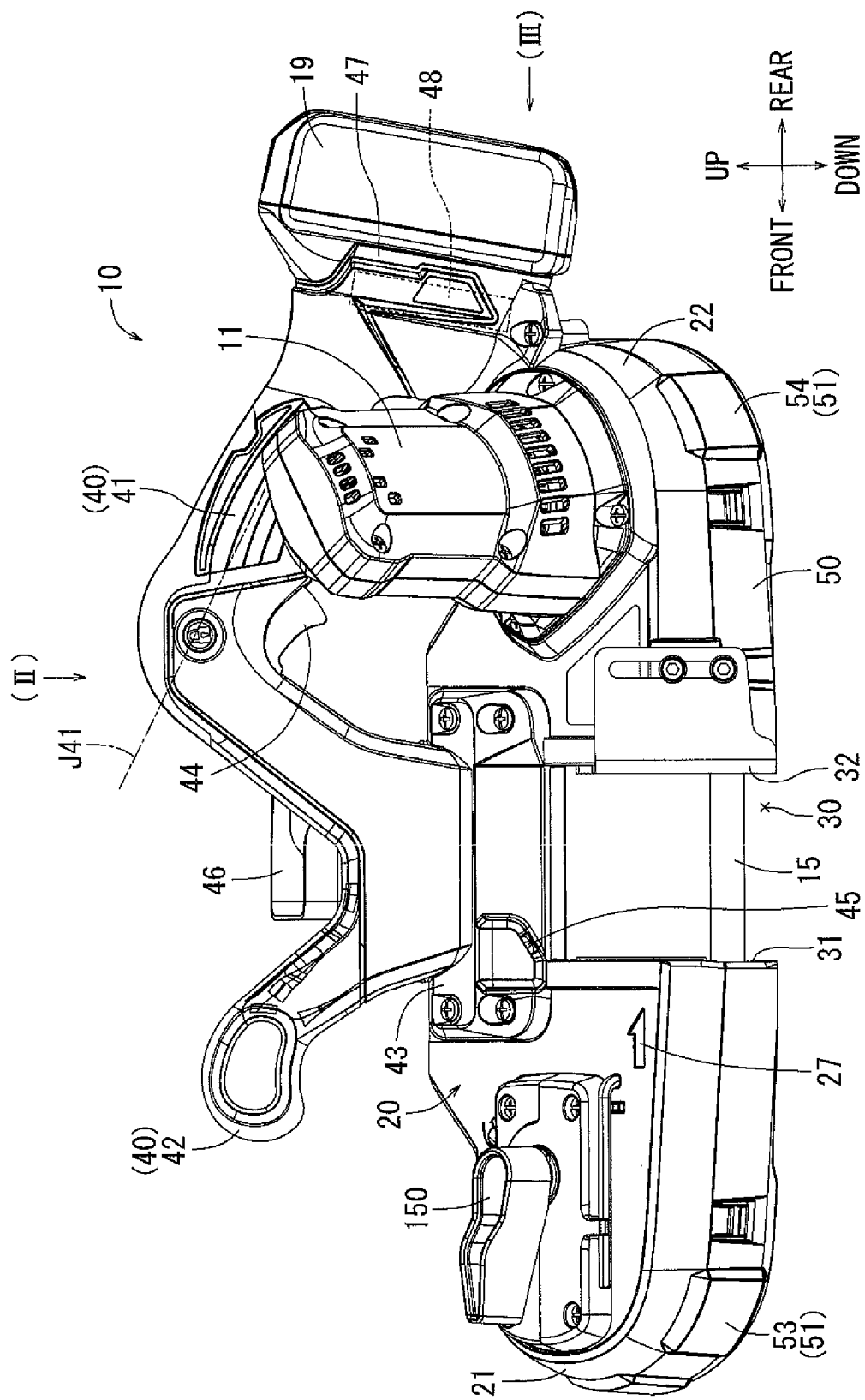
FIG. 1 is an overall left side view of a portable band saw according to an exemplary embodiment of the present disclosure.
Figure 2:
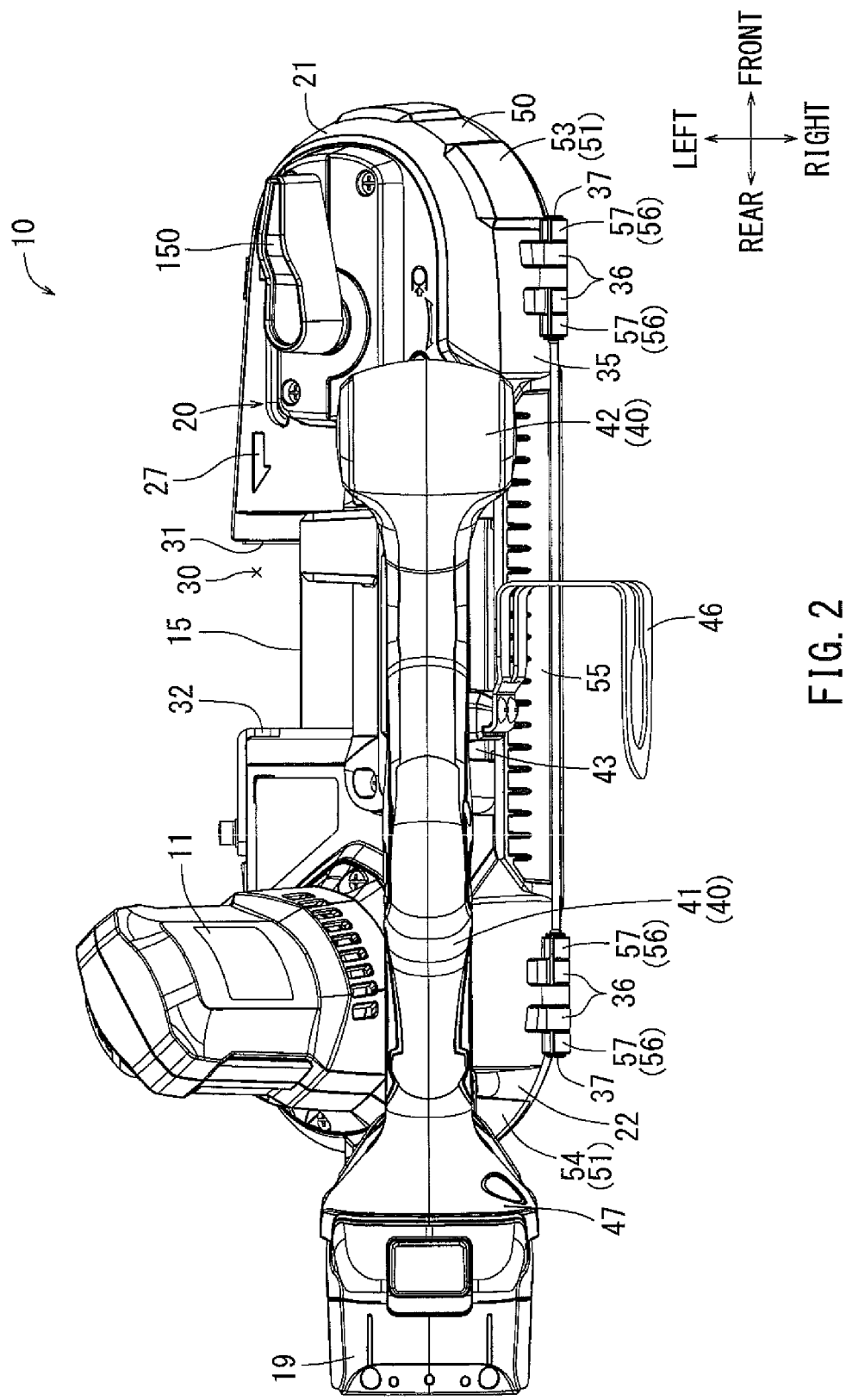
FIG. 2 is a perspective upper view of the portable band saw according to the exemplary embodiment, viewed in the direction indicated by an arrow (II) in FIG. 1.
Figure 3:
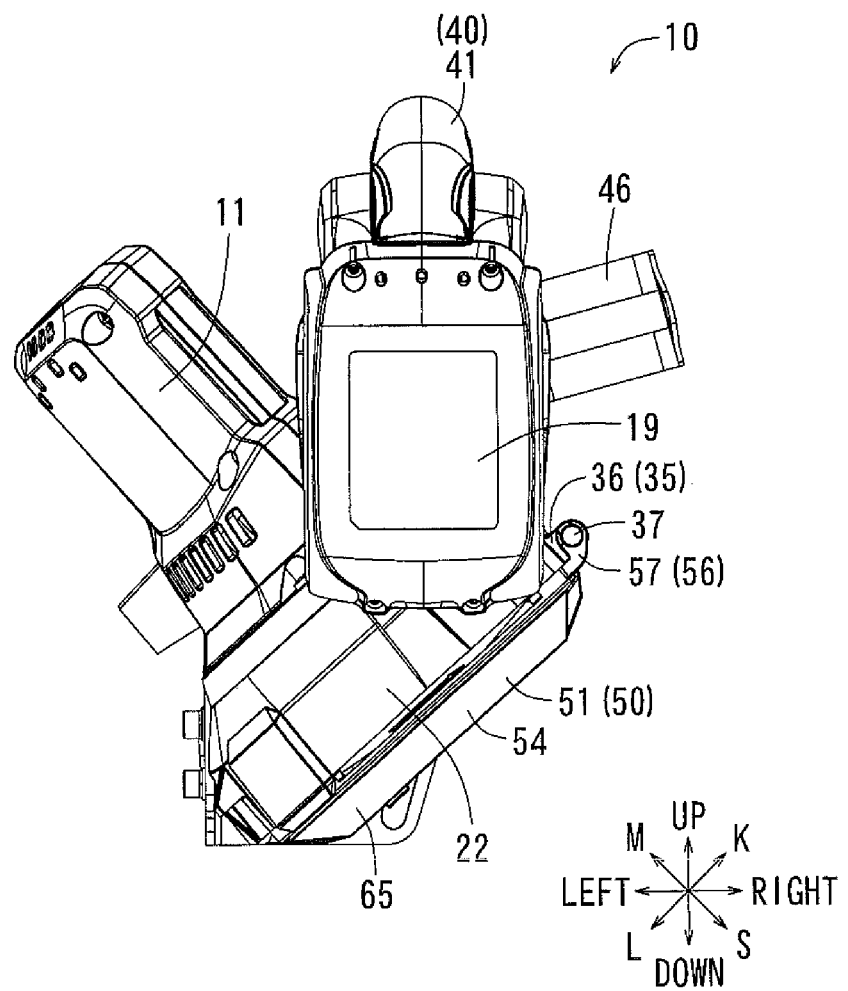
FIG. 3 is a perspective rear view of the portable band saw according to the exemplary embodiment, viewed in the direction indicated by an arrow (II) in FIG. 1.

Representative, non-limiting embodiments according to the present disclosure will be described with reference to FIGS. 1 to 11. For the portable band saw 10 shown in FIG. 1, the left side of FIG. 1 is referred to as a front side, as indicated by the legend. The right side in FIG. 1 is referred to as a rear side, as indicated by the legend. Furthermore, as shown in FIG. 3, a direction along which a handle 40 extends is an up-to-down direction, and the orientation of directions depicted as left and right is based on a rear view of portable band saw 10. Furthermore, as shown in FIG. 3, a direction in which an electric motor 11 extends is positioned approximately between the up-to-down direction and the left-to-right direction. Considering this configuration, the direction in which the electric motor 11 extends is referred to as an M direction, and an opposing direction to the M direction is referred to as an S direction. Furthermore, as depicted in FIG. 3, in a direction perpendicular to the M-to-S direction, a direction toward an opening 30 is referred to as an L direction, and an opposite direction to the L direction is referred to as a K direction.

Figure 5:
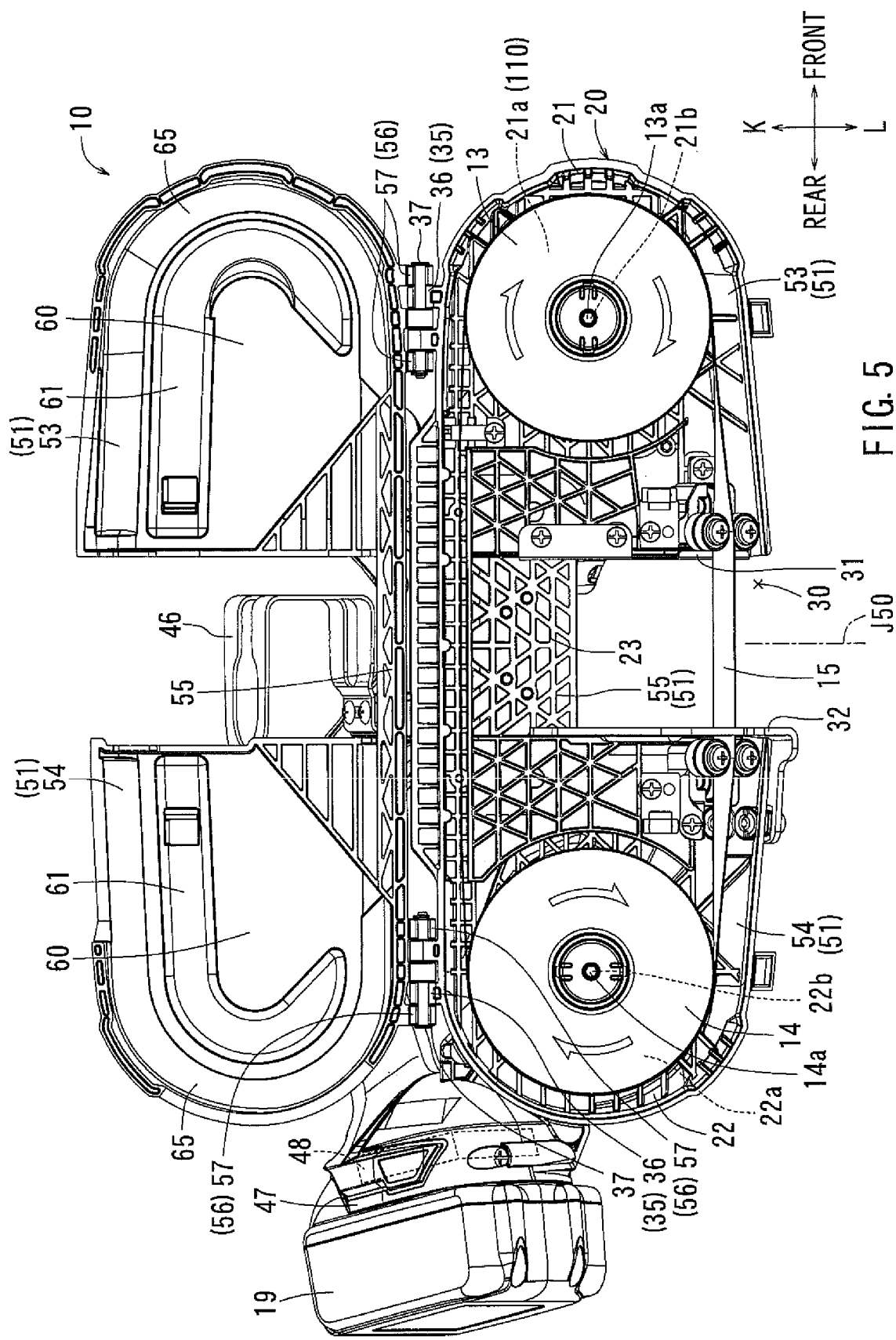
FIG. 5 is a perspective view of the portable band saw with the cover thereof opened, viewed in the direction M indicated by the axes in FIG. 3.

As shown in the figures, the portable band saw 10 may be rechargeable and capable of being carried. As shown in FIGS. 1 and 5, the portable band saw 10 may include a pair of front and rear saw wheels 13, 14 that are rotated by an electric motor 11 as a drive source. The portable band saw 10 may also include a saw wheel housing 20 that houses the front and rear saw wheels 13, 14. The portable band saw 10 may further include a continuous band saw blade 15 that is fit around both the front saw wheel 13 and the rear saw wheel 14. The saw wheel housing 20 may include a front housing 21 that houses and supports the front saw wheel 13, and may include a rear housing 22 that houses and supports the rear saw wheel 14. A width direction of the band saw blade 15 may extend parallel to the M-to-S direction within most of the saw wheel housing 20. However, in the opening 30 through which the band saw blade 15 passes, the band saw blade 15 may be twisted by guide members 31, 32 such that the width of the band saw blade 15 extends parallel to the up-to-down direction.

Figure 6:
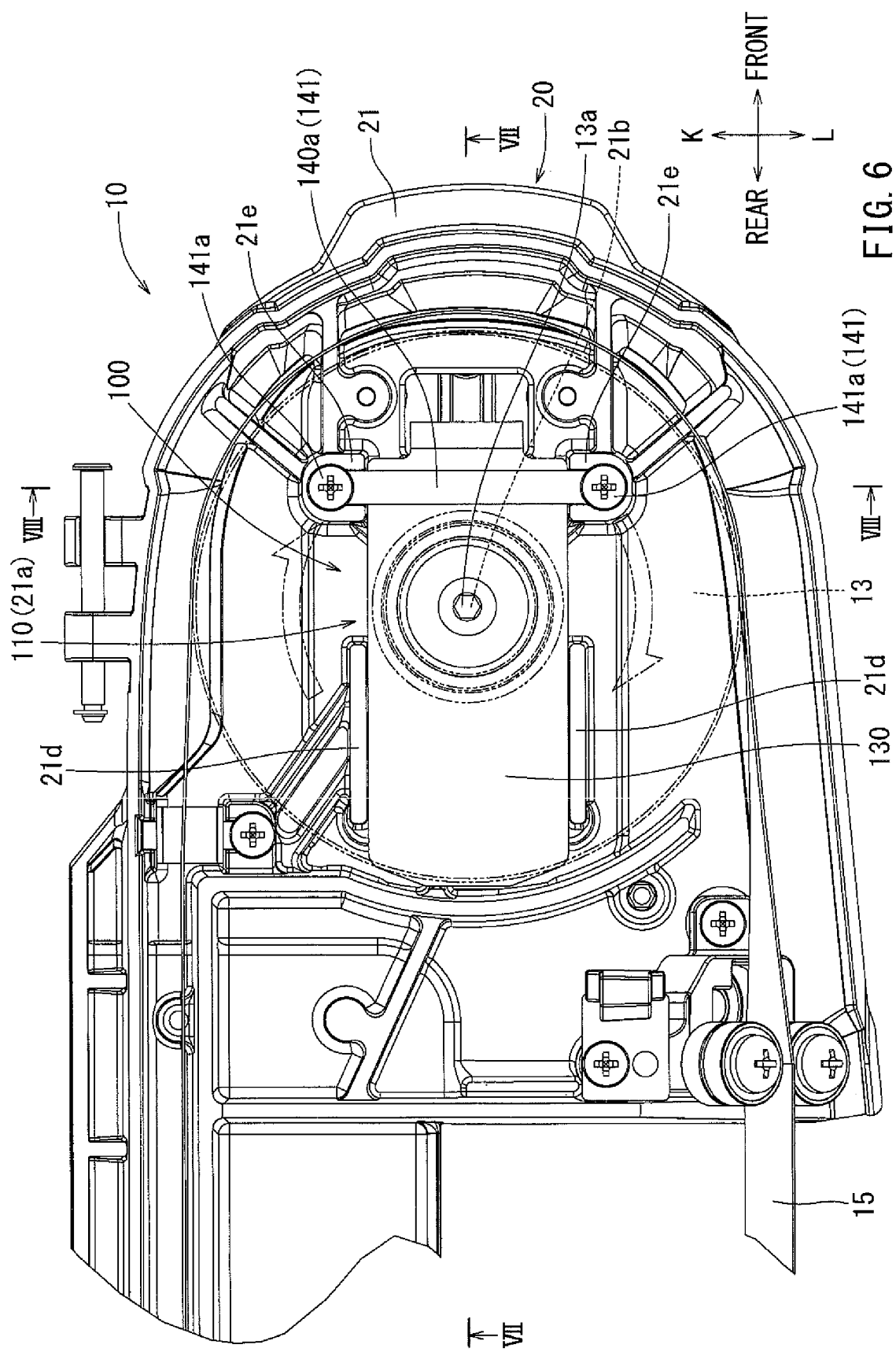
FIG. 6 is the portable band saw in FIG. 5, in which a driven-side saw wheel is removed (the removed wheel is indicated by the two-dot line), showing that tension is not applied to a band saw blade by a tension load adjustment mechanism.
Figure 7:
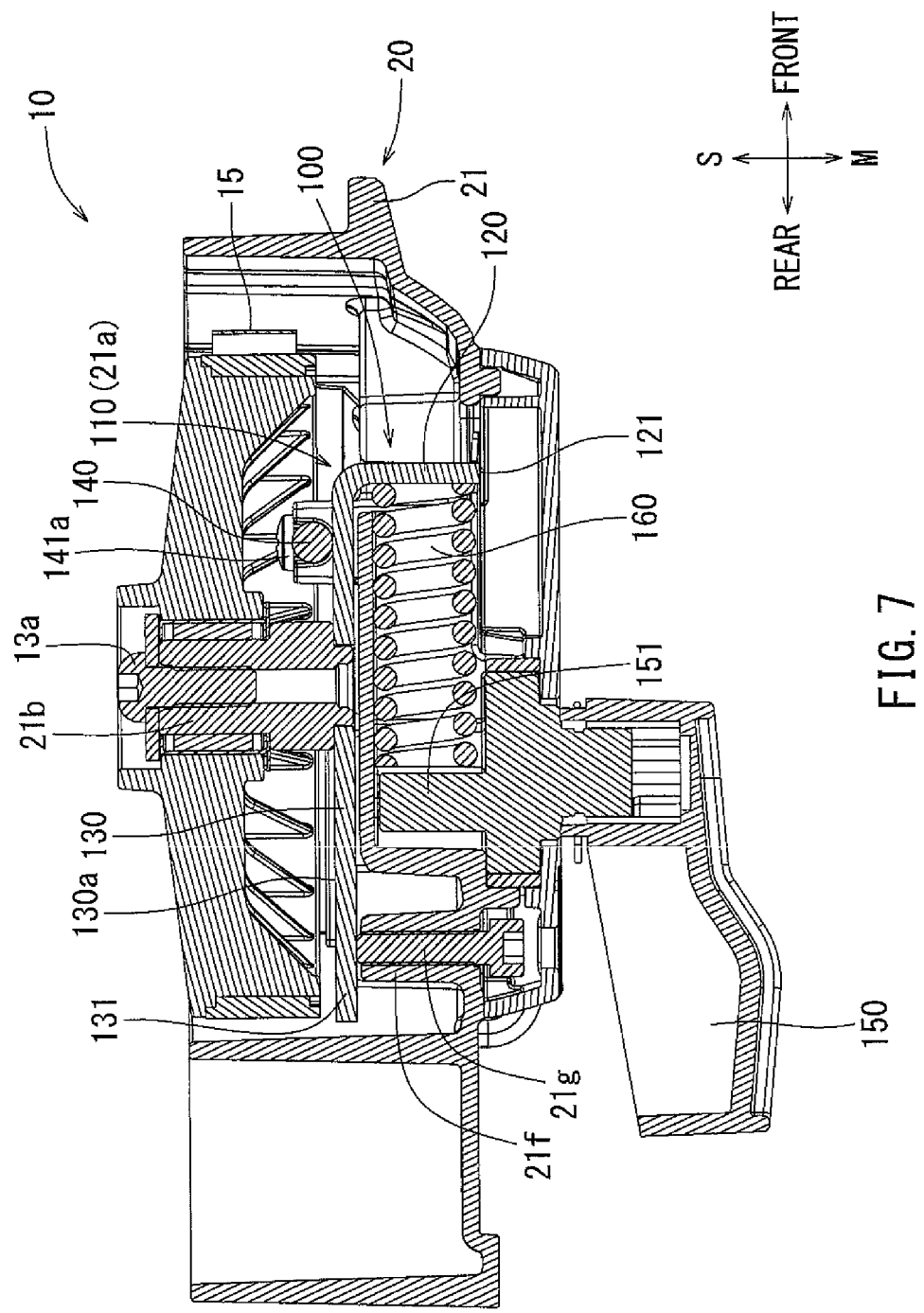
FIG. 7 is a cross-sectional view taken along line VII-VII of FIG. 6.

As depicted in FIGS. 5 to 7, the front saw wheel 13 may be rotatably assembled in a manner such that the front saw wheel 13 is prevented from being removed from a wheel support shaft 21b via a screw 13a. The wheel support shaft 21b may be firmly fixed to a slide plate 110. The slide plate 110 may serve as a wheel support portion 21a in the front housing 21. Furthermore, the rear saw wheel 14 may be rotatably assembled in a manner such that the rear saw wheel 14 is prevented from being removed from a wheel support shaft 22b via a screw 14a, the wheel support shaft 22b being firmly fixed to a wheel support portion 22a in the rear housing 22. The wheel support shaft 21b and the wheel support shaft 22b may be parallel to the M-to-S direction.

As shown in FIG. 7, a boss 21f, into which an adjustment screw 21g can be screwed, may be formed in the front housing 21. An advancing amount of the adjustment screw 21g can be adjusted from the side of the portable band saw 10 with a lever 150, discussed in greater detail below. By rotation of the adjustment screw 21g, a tip end thereof may be pressed against a second support portion 131 of a long side 130 of the slide plate 110. The second support portion 131 and the long side 130 are discussed in greater detail below. The long side 130 may be tilted in the axial direction of the wheel support shaft 21b by rotation of the adjustment screw 21g. As depicted in FIG. 7, the long side 130 may be swung around a pin 140. When the long side 130 is swung, the pin 140 may serve as the pivot axis of the swing movement. When the long side 130 of the slide plate 110 is tilted, the long side 130 pushes the front saw wheel 13 via the wheel support shaft 21b, so as to allow for centering the front saw wheel 13 by rotating the adjustment screw 21g. This configuration has the additional benefit of allowing for centering without needing to open the cover body 51 or removing the front saw wheel 13.

The electric motor 11 may be located on the rear housing 22 and may extend in the M direction. Because of this configuration, the rear saw wheel 14 may serve as a driving wheel that is directly rotated by the electric motor 11. The front saw wheel 13 may serve as a driven wheel. The driven wheel may be indirectly driven by the electric motor 11 and/or the rear saw wheel 14, for example via the band saw blade 15.

Figure 9:
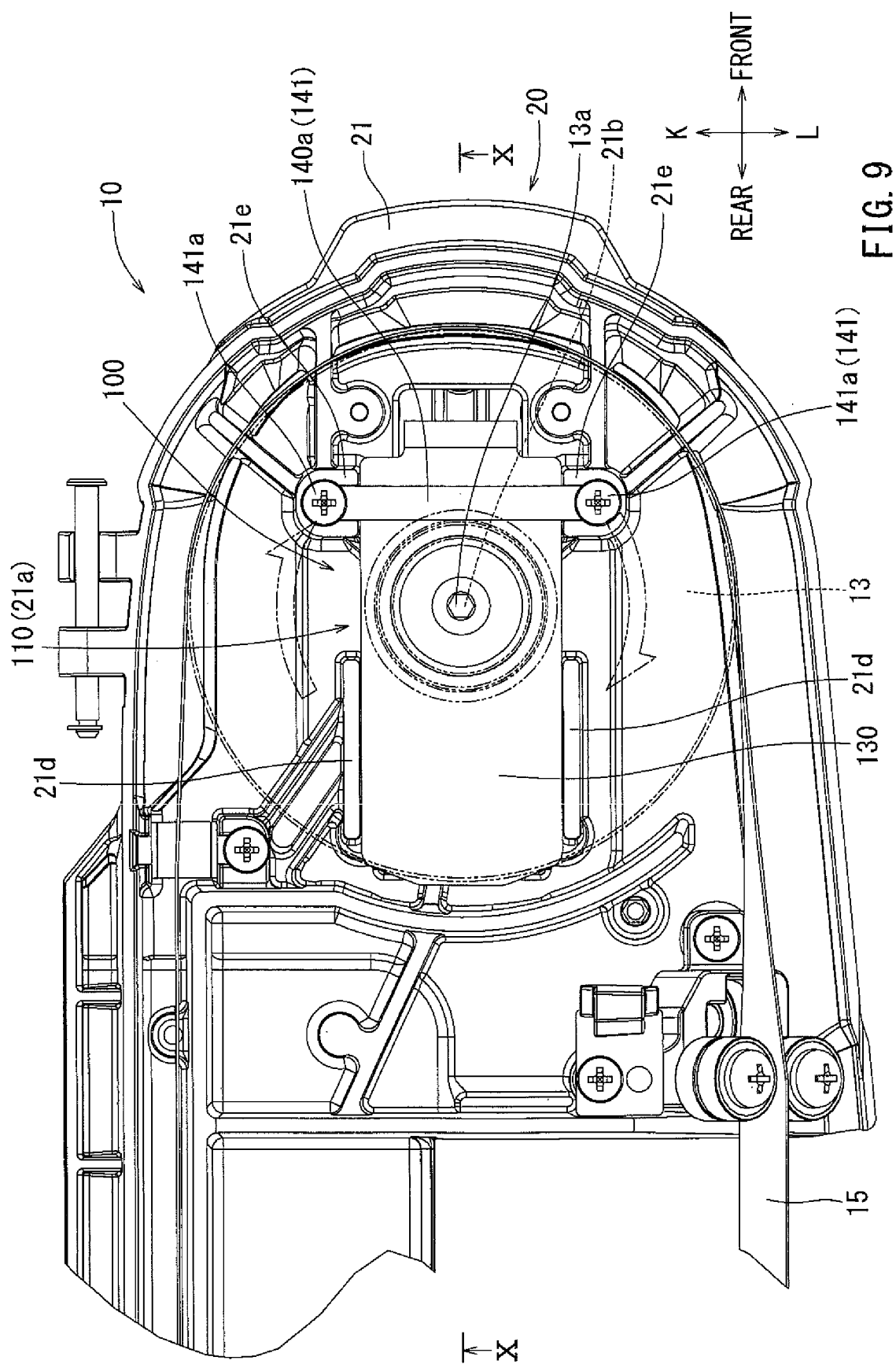
FIG. 9 is the portable band saw in FIG. 6, showing that tension is applied to the band saw blade by the tension load adjustment mechanism.
Figure 10:
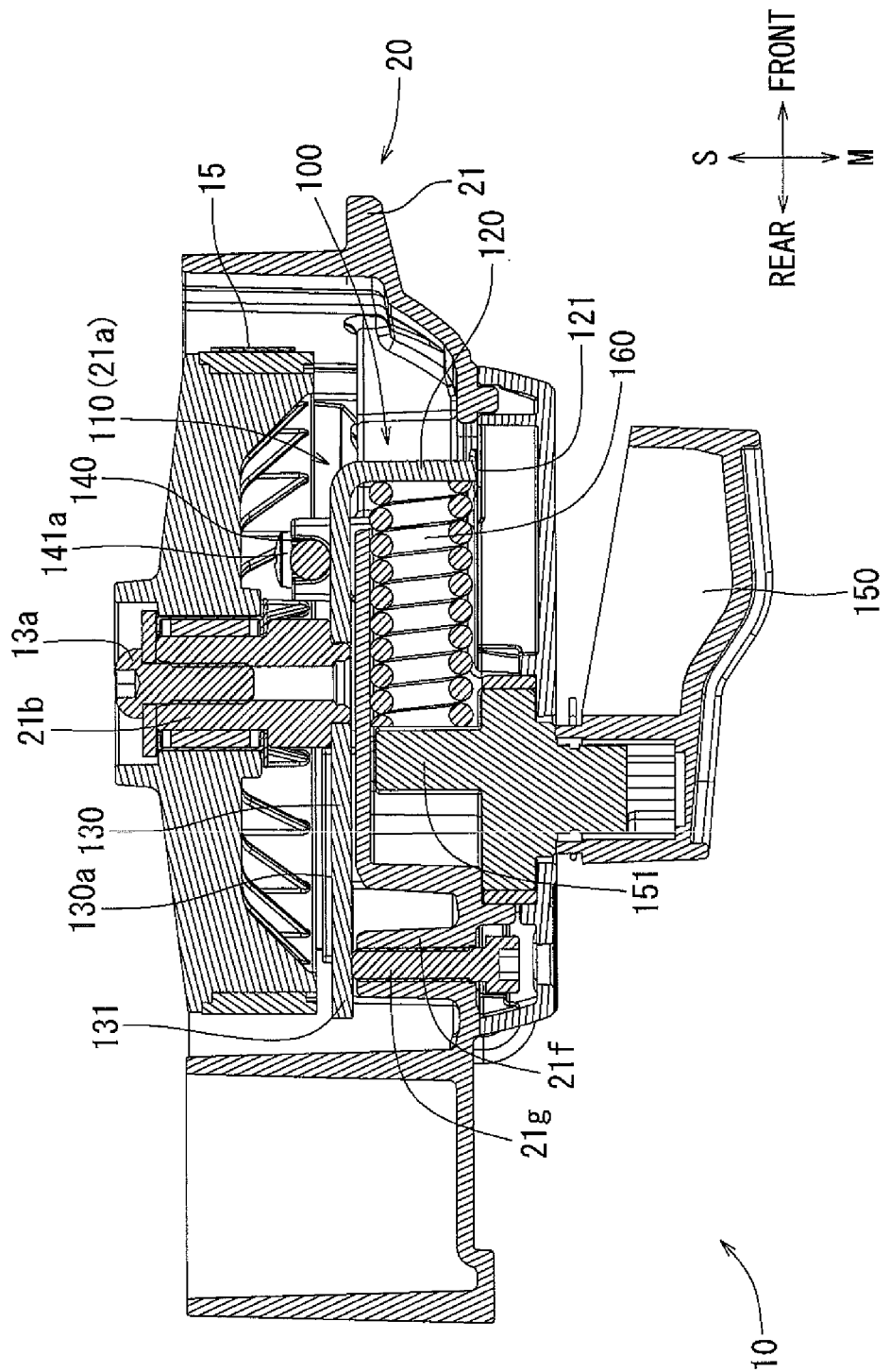
FIG. 10 is a cross-sectional view taken along line X-X of FIG. 9.

The band saw blade 15 with a predetermined width and having flexibility in the circulating direction may be fit around both the rear saw wheel 14 serving as the driving wheel and the front saw wheel 13 serving as the driven wheel. A lever 150 may be provided with a cam 151. The cam 151 may be arranged on the upper surface of the front housing 21, as shown in FIG. 1. By rotating the lever 150 within a predetermined angle range, the cam 151 may compress a compression spring 160. The compression of the compression spring 160 may cause the slide plate 110 to slide in the forward direction, as shown in FIGS. 9 and 10. As the front saw wheel 13 may be connected to the slide plate 110 via the wheel support shaft 21b, movement of the slide plate 110 may also cause movement of the front wheel 13 in the same direction. Because of this configuration, a distance between the front saw wheel 13 and the rear saw wheel 14 may be adjusted. Accordingly, the tension of the band saw blade 15 that is fitted around both the front saw wheel 13 and the rear saw wheel 14 may be adjusted. Additionally, the band saw blade 15 may be attached to and detached from the saw wheels 13 and 14 by adjusting the tension beyond a certain threshold.

Figure 4:
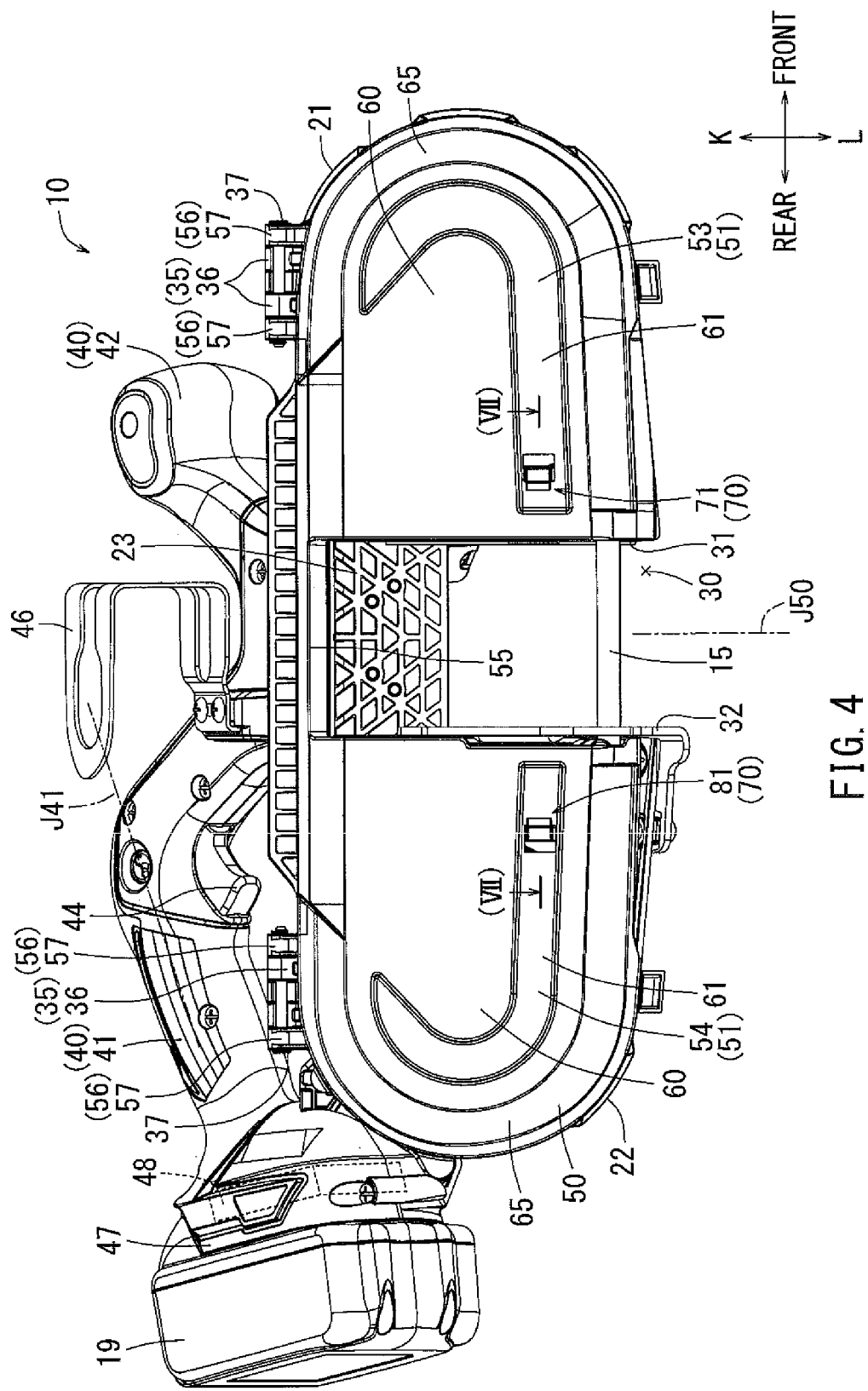
FIG. 4 is a perspective view of the portable band saw with a cover thereof closed, viewed in the direction M indicated by the axes in FIG. 3.

As shown in FIGS. 4 and 5, the front housing 21 and the rear housing 22 may be coupled to each other via a connection housing 23 that extends in the K-to-L direction. The opening 30, which may have a rectangular shape when viewed in the M direction, may be provided between the front housing 21 and the rear housing 22 in the direction L from the connection housing 23. The first guide member 31 may be provided on the front side of the opening 30, and the second guide member 32 may be provided on the rear side of the opening 30. In the opening 30, the band saw blade 15 may be exposed between the front and rear housing 21, 22. The rear saw wheel 14, serving as the driving wheel, may rotate counterclockwise, as shown in FIG. 1. Thus, the band saw blade 15 may circulate counterclockwise, and the band saw blade 15 exposed to the outside in the opening 30 may move from the front side to the rear side, for example from left to right as seen as seen in FIG. 1. As shown in FIG. 1, an arrow 27 showing a movement direction of the band saw blade 15 may be marked on the upper surface of the front housing 21. In the following explanation, the direction shown by the arrow 27 may correspond to as a circulation direction of the band saw blade 15. The band saw blade 15 may cut a workpiece (not shown) by pressing against the workpiece while being circulated.

As shown in FIG. 1, a handle 40 for a user to grasp may be provided on the upper portion of the saw wheel housing 20. The handle 40 may straddle an upper portion of the rear housing 22 as well as the connection housing 23. The handle 40 may include a main grip 41 for the user to grasp with his/her hand and a sub grip 42 to grasp with the other hand. The main grip 41 may be arranged on the rear side of a cutting portion (e.g., a cutting position of the band saw blade 15 with respect to the workpiece) of the opening 30. Furthermore, a portion of the main grip 41 may extend from the rear side of the rear housing 22 in the forward and upward direction, and another portion may extend in the downward direction. In other words, the main grip 41 may be formed in a mountain shape.

As shown in FIG. 1, a handle axis line J41 of the main grip 41 may be tilted in the upward direction, from the rear side to the front side. A user holding the main grip 41 may apply a pressing force (e.g., a cutting force of the band saw blade 15 with respect to the workpiece) in a direction perpendicular to the handle axis line J41. A position and direction of the main grip 41 may be configured in a proper manner such that the cutting position of the band saw blade 15 is aligned in a direction of the pressing force. Because of this configuration, the pressing force caused by the hand of the user holding the main grip 41 may be applied to the cutting position in an effective manner. This reduces a load applied to the user's hand and/or wrist. As a result, the user can rapidly perform a cutting task in a comfortable manner.

As shown in FIG. 1, the end portion of the main grip 41 may be coupled to a handle base 43. A switch lever 44, which may be configured to be pulled by a finger of the user's hand with which the user holds the main grip 41, may be provided on the lower side of the main grip 41. When the switch lever 44 is pulled in the upward direction, the electric motor 11 may run to circulate the band saw blade 15. The handle base 43 may be screw fixed on the upper surface of the connection housing 23. Furthermore, the sub grip 42 may extend from the handle base 43 obliquely upward and towards the front. The user may hold the main grip 41 with one hand and the sub grip 42 with the other hand. Because of this configuration, the user may hold the portable band saw 10 in a stable manner and rapidly perform the cutting task in a comfortable manner.

An illumination lamp 45 may be arranged on the upper surface of the handle base 43. The illumination lamp 45 may illuminate the cutting position of the band saw blade 15 exposed in the opening 30. Because of this configuration, a cutting task in, for example dark places, can be performed in a comfortable manner. LEDs (light emitting diodes) may be used for the illumination lamp 45. The illumination lamp 45, as well as the electric motor 11, may be powered by a battery pack 19. As shown in FIG. 2, a hook 46 may be attached to the right side of the handle base 43. The portable band saw 10 may be hung, for example on a scaffold in a workplace, from the hook 46.

As shown in FIG. 1, a battery attachment portion 47 may be provided at the rear end portion of the main grip 41. The battery pack 19 may be attached to the battery attachment portion 47. The battery pack 19 may be composed of a lithium ion battery in which a plurality of lithium ion cells are housed. The battery pack 19 may be slidably attached to and detached from the battery attachment portion 47. The battery pack 19 may be detached from the battery attachment portion 47 and recharged by a separate dedicated charger when an amount of charge of the battery pack 19 becomes low. An auto stop controller (AS controller) 48 may be housed in the battery attachment portion 47. The AS controller 48 may monitor a power supply state, such as, for example, a supplying current from the battery pack 19 and a remaining capacity of the battery pack 19. When the AS controller 48 detects any failure with respect to the battery pack 19, the AS controller 48 may automatically shut off power to a power circuit and stop driving the electric motor 11 (auto stop function).

The saw wheel housing 20 may be provided with a cover 50 that covers the pair of saw wheels 13, 14. The cover 50 may include a cover body 51 that is configured to cover both the front housing 21 and the rear housing 22. The cover body 51 may include a front cover 53 that faces the front housing 21, a rear cover 54 that faces the rear housing 22, and a connection portion 55 that integrally connects the front cover 53 and the rear cover 54. The cover body 51 may be hinge-connected to the saw wheel housing 20 along a connection side end edge 56. The connection side end edge 56 may be disposed at an end edge of the cover body 51 in the K direction. For example, a shaft receiving portion 57 may be provided along each of the front and rear connection side end edges 56 of the cover body 51. A supporting shaft 37 may be inserted into each of the shaft receiving portions 57. The supporting shaft 37 may be supported by a shaft supporting portion 36 that is provided on a connection side end edge 35 of the saw wheel housing 20. The cover body 51, together with the shaft receiving portion 57, may rotate around the supporting shaft 37, the supporting shaft 37 serving as a rotation axis. The cover body 51 and the shaft receiving portion 57 may be supported by the saw wheel housing 20 via the supporting shaft 37.

As shown in FIG. 5, the front cover 53 and the rear cover 54 may be configured to be approximately symmetrical in the front-to-rear direction. For example, the front cover 53 and the rear cover 54 may be symmetrical with regard to a front-to-rear intermediate axis line J50. The connection portion 55 may integrally connect the front cover 53 and the rear cover 54. The connection portion 55 may be formed so as not to entirely cover the opening 30 when the cover body in a closed state. Accordingly, the cutting position of the band saw blade 15 may be positioned in the opening 30 without interference by the connection portion 55. In some embodiments, the height (e.g., in the K-L direction) of the connection portion 55 may be shorter than the height of the connection housing 23. For example, the height of portion of the opening 30 in the area corresponding to the connection portion 55 may be taller than the height of the portion of the opening 30 in the area corresponding to the connection housing 23. By reducing the amount of material that is used for the connection portion 55, the overall weight of the device may be reduced.

The front cover 53 and the rear cover 54 may each include a flat portion 60 and an inclination portion 65. The flat portion 60 in the front cover 53 and in the rear cover 54 may be formed to be approximately symmetric in the front-to-rear direction, for example with respect to the front-to-rear intermediate axis line J50. Similarly, the inclination portion 65 in the front cover 53 and in the rear cover 54 may be formed to be approximately symmetric in the front-to-rear direction with regard to the front-to-rear intermediate axis line J50. The flat portion 60 and the inclination portion 65 will be explained below by referring to those on the front cover 53.

The flat portion 60 may have a generally planar shape. When the cover body 51 is closed, the flat portion 60 may face the saw wheel 13. The flat portion 60 may be flat along the plane in the front-to-rear direction and in the K-to-L direction. The flat portion 60 may include a concave portion 61 disposed in the generally circumferential direction of the cover body 51, when viewed in the M direction, as shown in FIG. 4. The concave portion 61 may be formed in a stepped manner so as to be closer (for example by a predetermined length) to the saw wheel 13 than the flat portion 60, when the cover body 51 is closed. The inclination portion 65 may be provided along a portion of the outer circumference of the flat portion 60. The inclination portion 65 may be formed to be closer to the outer periphery of the saw wheel housing 20 than the flat portion 60, when the cover body 51 is closed. This relative positioning may continue as the inclination portion 65 extends to its outer circumferential end.

A locking mechanism 70 for retaining a closed position of the cover 50 may be provided between the saw wheel housing 20 and the cover body 51. The locking mechanism 70 may include front and rear locking mechanisms 71, 81. The front locking mechanism 71 may be provided between the front housing 21 and the front cover 53, and the rear locking mechanism 81 may be provided between the rear housing 22 and the rear cover 54. The front locking mechanism 71 and the rear locking mechanism 81 may be positioned so as to be disposed on an inner side (e.g., radially inward) from the circulating path of the band saw blade 15. The front locking mechanism 71 and the rear locking mechanism 81 may be disposed to be approximately symmetric in the front-to-rear direction, for example with regard to the front-to-rear intermediate axis line J50.

Figure 8:
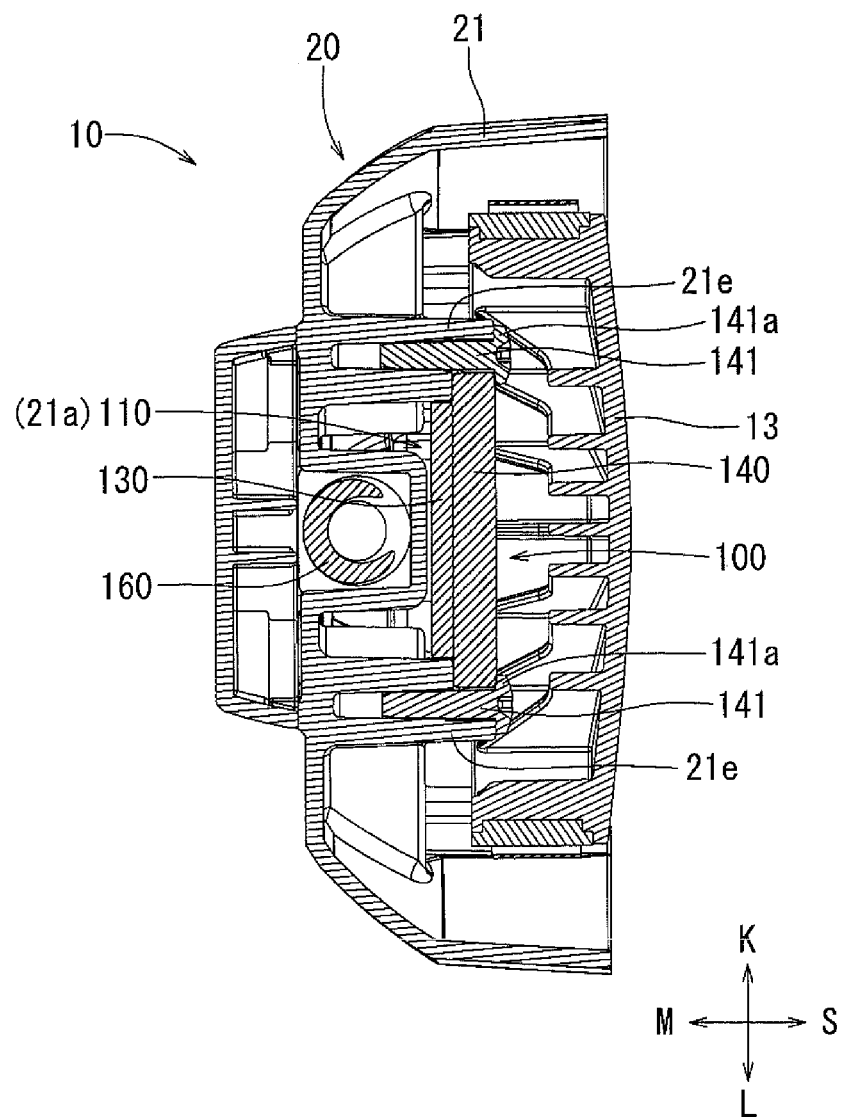
FIG. 8 is a cross-sectional view taken along line VIII-VII of FIG. 6.

As depicted in FIGS. 6 to 8, the portable band saw 10 may be provided with a tension adjustment mechanism 100 that includes a slide plate 110 for applying tension to the continuous band saw blade 15. An embodiment of the tension adjustment mechanism 100 will be explained below in greater detail. In the tension adjustment mechanism 110, the slide plate 110 may include the short side 120 and the long side 130. The short side 120 and the long side 130 may be structured to form approximately an L shape when viewed in the K-to-L direction, as shown in FIG. 7. A first support 121, with which one end of the compression spring 160 is engaged, may be positioned at a tip end of short side 120.

Furthermore, a second support 131 may be positioned at approximately an end of the long side 130 opposite the short end 120. The second support 131 may contact the adjustment screw 21g. The adjustment screw 21g may serve a support function, as well as an adjustment function. The wheel support shaft 21b may be firmly attached to a surface 130a of the long side 130.

The compression spring 160 may be disposed between the short side 120 of the slide plate 110 and the cam 151 of the lever 150. For example, the compression spring 160 may be firmly hooked to the short side 120 of the slide plate 110 and may be spaced apart or directly contacting the cam 151. Rotation of the lever 150 may slide the slide plate 110 in the outward direction (e.g., in the forward direction) due to the compression spring 160 being compressed by the cam 151, as shown in FIGS. 9 and 10. For example, the rotational orientation of the lever 150 may be directly related to the rotational orientation of the cam 151. In one orientation, the compression spring 160 may be in an essentially uncompressed state. In the essentially uncompressed state, the compression spring 160 may allow for the front saw wheel 13 to be able to slide in a front-to-rear direction. However, in another orientation, the cam 151 may push against the compression spring 160 with enough force so as to cause the short side 120 to move in the forward direction. This, in turn, causes the front saw wheel 13 to also move in the forward direction. The front saw wheel 13, in turn, increases the tension of the band saw blade 15. Eventually, the tension in the band saw blade 15 will overcome the forward moving forces. As the lever 150 continues to rotate, thereby causing the cam 151 to rotate, the compression spring 160 will begin to further compress, allowing for a more stable force being ultimately applied to the band saw blade 15.

As depicted in FIGS. 6 and 9, ribs 21d may be formed in the front housing 21 so as to be face each other. The ribs 21d may be structured and positioned such that each rib 21d abuts and/or holds a corresponding side edge of the long side 130 of the slide plate 110. For example, the ribs 21d may be positioned to contact the side edges of the long side 130 at a rear portion of the long side 130 and on the side surfaces in the K-to-L direction. When the long side 130 of the slide plate 110 is seen in a direction perpendicular to the top surface 130a of the long side 130 (e.g., viewed in the M direction), the long side 130 may be disposed parallel to the front-to-rear direction. Furthermore, as shown in FIG. 6, ribs 21d may be disposed parallel to each other in the front-to-rear direction. There may be slight gaps between the long sides 130 of the slide plate 110 and the ribs 21d, such that the smooth slide movement is not hindered. Because of this configuration, the slide direction of the slide plate 110 may be limited to essentially the front-to-rear direction. For example, the ribs 21d may aid in preventing rotational movement of the slide plate 110, at least in part due to the increased potential contact surface in the rotational direction.

As shown in FIG. 8, bosses 21e, which are formed in approximately a U-shape when seen from in the front-to-rear direction, may be formed in the front housing such that the bosses 21e are disposed opposite to each other in the K-to-L direction. Furthermore, the bosses 21e may be structured and positioned so as to contact the corresponding side edges of the long side 130. For example, an inwardly facing portion of each boss 21e may abut or be closely spaced apart from the side edges of the long side 130 at a front portion of the slide plate 110 in the K-to-L direction. As also shown in FIG. 8, opposite side walls of bosses 21e may be have differing heights (e.g., in the M-to-S direction). For example, the inwardly facing walls of the bosses 21e (e.g., the walls facing each other) may be shorter than the outwardly facing walls of the bosses 21e (e.g., the walls facing away from each other). A screw 141 may be screwed into each of the bosses 21e. Essentially all of one side of the shaft portion of the screw 141 may contact at least one of the walls of the corresponding boss 21e, while less than essentially all of another side of the shaft portion of the screw 141 may contact at least one of the walls of the corresponding boss 21e. Each screw head 141a may contact less than all of an upper surface of each of the bosses 21e. For example, each screw head 141a may contact a taller portion (e.g., outwardly facing walls) of the bosses 21e, but may be spaced apart from the short portion (e.g., inwardly facing walls) of the bosses 21e. Each screw head 141a of the screws 141 may contact a corresponding end of a pin 140. The portion of the screw head 141a that comes in contact with the pin 140 may correspond to the portion of the screw head 141a overlapping the shorter portion of the boss 21e. The portion of the pin 140 being contacted by the screw head 141a may contact an upper surface (e.g., the upper surface of the shorter portion) of the boss 21e. Furthermore, as shown in FIG. 8, the long side 130 of the slide plate 110 may be pinched by the front hosing 21 and the pin 140. For example, a front portion of the long side 130 of the slide plate 110 may be pinched between the front housing 21 and the pin 140

In some embodiments, the pin 140 may be structured to have a generally cylindrical shape, although other shapes may be possible, such as a flat planar shape. Additionally, the pin 140 may be structured with a plurality of shapes. For example, the pin 140 may be generally cylindrical in the portion corresponding to the long side 130, but may have a more flattened shape in the area corresponding to the screw heads 141a. With an at least partially cylindrical shape, the pin 140 may come into line-contact with the long side 130 with the cylindrical portion of the pin 140. Because of this configuration, the pin 140 may not bite into the top surface 130a of the slide plate 110. Thus, when the slide plate 110 is slid, the pin 140 may not serve as a substantial resistance force against the slide movement.

As shown in FIGS. 6 and 7, the pin 140 may be positioned between the first support 121 and the wheel support shaft 21b, for example in the M-to-S direction. Furthermore, the pin 140 may extend in a direction essentially perpendicular to the slide movement, for example when viewed in the M direction. The pin 140 may be formed in the cylindrical shape in at least a portion thereof coming into line contact with the long side 130 of the slide plate 110, as discussed above.

Referring to FIG. 10, an embodiment of the workings of the tension adjustment mechanism 100 will be explained. For example, when the lever 150 is rotated to slide the slide plate 110 outward (e.g., in the forward direction), the slide plate 110 may be spring biased by the compression spring 160, the compression spring 160 being compressed by the rotation of the cam 151. Accordingly, the slide plate 110 may be kept in the slid position while being spring biased.

When a tension adjustment mechanism of a conventional portable band saws is in the compressed state, a force received from the band saw blade and a force received from a compression spring of a tension adjustment mechanism may be equal in magnitude but opposite in direction. In such a state, both forces may be balanced in these directions. For example, in FIG. 16, the force supplied by the compression spring 360 (e.g., in the rightward direction) may be balanced with the force supplied by the band saw blade 215 (e.g., in the leftward direction). More specifically, the forces acting on the slide plate 310 are balanced in the left-right direction in FIG. 16.

Figure 16:
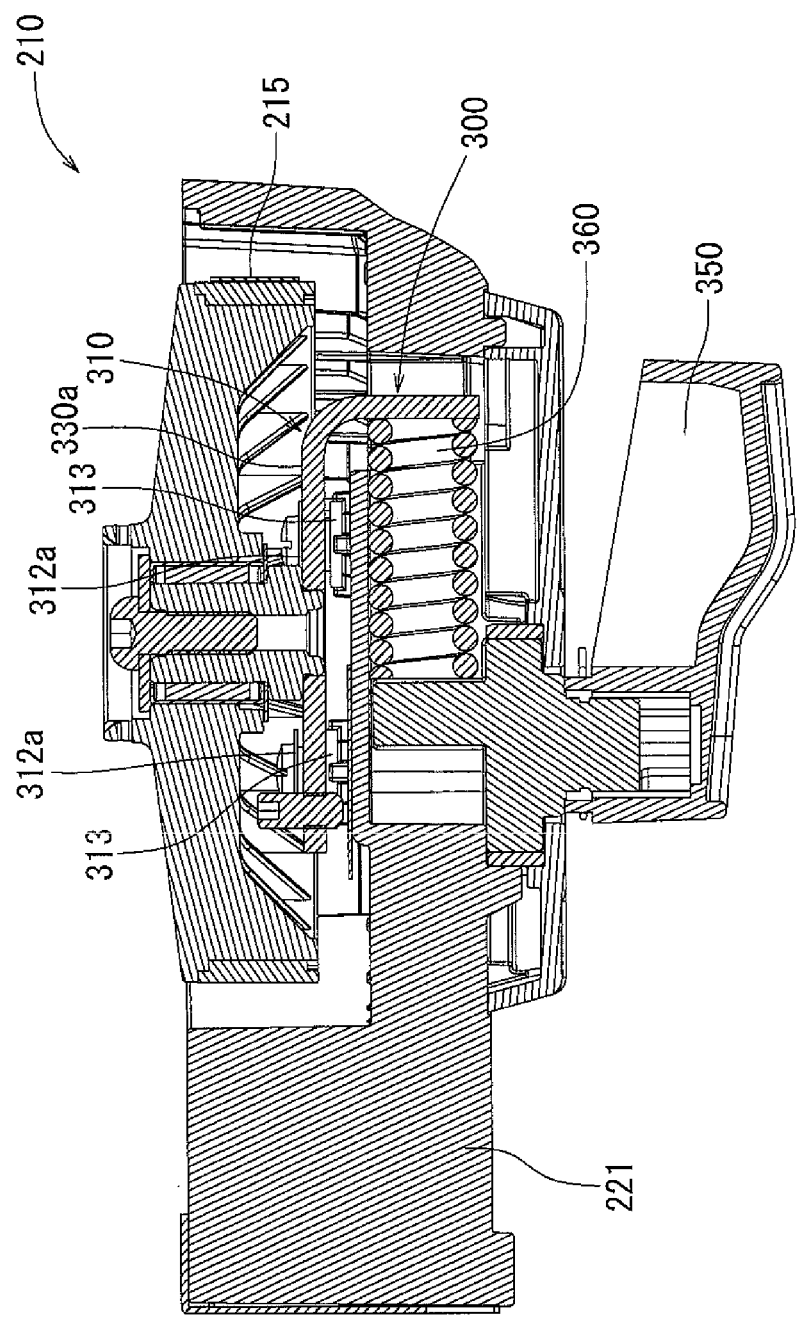
FIG. 16 is a cross-sectional view taken along line XVI-XVI of FIG. 15.

However, as can be seen in FIG. 16, these leftward-rightward acting forces are not aligned in the up-down direction. More specifically, the compression spring 360 is applying the rightward force at a point lower than the leftward force of the band saw blade 215. Accordingly, an unbalanced rotational force may be applied to the slide plate 310. For instance, the slide plate 310 may have a force applied to it such at it may rotate in the counter-clockwise direction, as seen in FIG. 16. This can create complex bending issues in the slide plate 310, even if the tracking pin is used.

Figure 15:
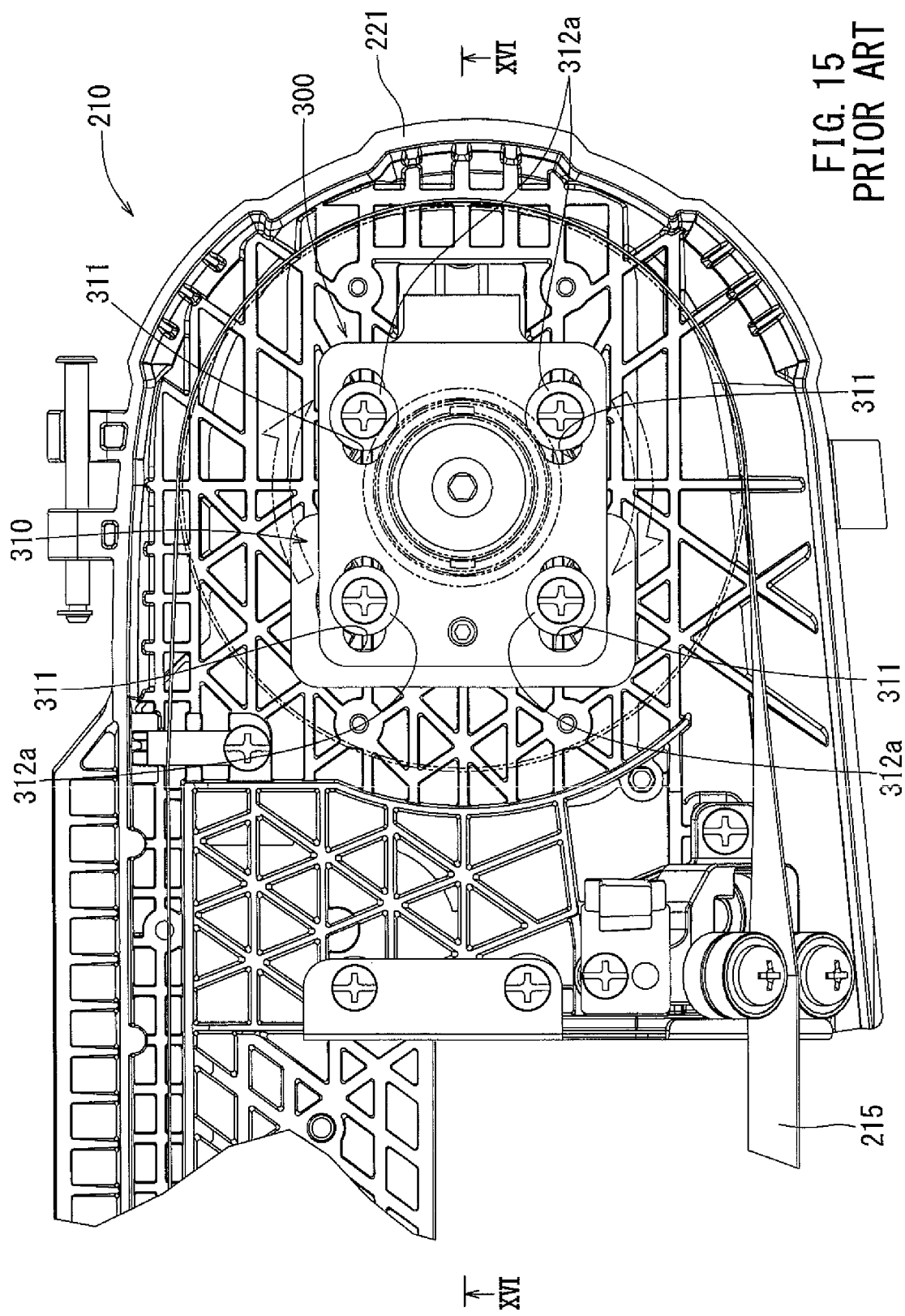
FIG. 15 is the portable band saw in FIG. 12, showing that tension is applied to the band saw blade by the tension load adjustment mechanism.

For instance, in FIG. 16 the compression spring 360 and the band saw belt 215 place a rotational force on the slide plate 310 such that the slide plate 310 contacts the right washers 312a, but not the left washers 312a. As the washers 312a have a circular shape and weaknesses are caused by the long holes 311 (e.g., see FIG. 15), bending may occur in the slide plate 310.

Even if the tracking adjustment screw were to be used as an attempt to minimize the rotational forces being applied to the slide plate 310, the slide plate 310 may still be subject to complex bending. For instance, the tracking adjustment screw may force the left side of the slide plate 310 upwards so as to contact left washers 312a, which may create similar issues as discussed above. Alternatively, tracking adjustment screw and the compression spring 310 may act together such that no part of the slide plate 310 contacts the washers 312a. However, this results in only the tracking adjustment screw opposing the rotation of the slide plate 310, and this opposition is in a direction perpendicular to both of the other forces causing rotation. These forces are being applied to various portions of the slide plate 310 in different direction. Since the slide plate 310 is unsupported and contains weaknesses from the long holes 311, the slide plate 310 is subject to complex bending.

Figure 17:
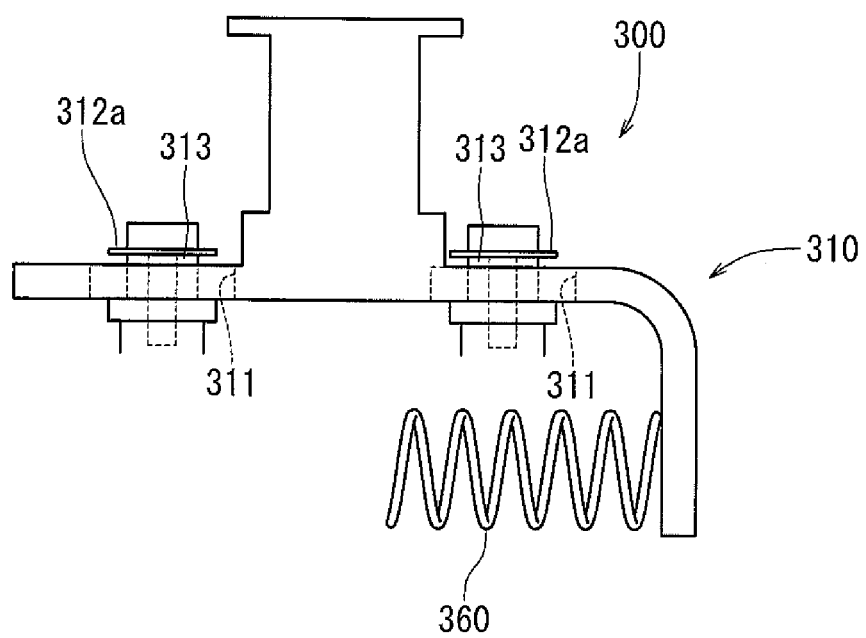
FIG. 17 is a schematic diagram of FIG. 16 showing a slide plate and its surroundings.

As depicted in schematic of FIG. 17, no notable forces are applied to the slide plate 310 when the compression spring 360 is in a compressed state. For instance, there is a gap between the top surface of the slide plate 310 and the washers 312a. It may be desirable to have this gap so as to allow for the slide plate 310 to freely move in the left-right direction for tension adjustment. Additionally, the gap may be desirable to allow for tracking to be adjusted, by allowing for saw wheel to be tilted using the tracking adjusting screw. Accordingly, the slide plate 310 may easily be subjected to undesirable rotational forces, which may cause complex bending issues, as described above. In contrast, the structure of the previously discussed embodiments of the portable band saw 10 have at least the benefit of minimizing many of these complex bending issues.

For example, when the previously described embodiments of the portable band saw 10 are tensioned, a force received from the band saw blade 15 and a force received from the compression spring 160 may be equal in magnitude but opposite in a direction. Thus both forces may be balanced in these directions (e.g., the front-to-rear direction). For example, the forces being applied to the wheel support portion 21a may be balanced in a radial direction of the wheel support shaft 21b. However, these two forces may be offset in the axial direction of the wheel support shaft 21b. For instance, as depicted in FIG. 10, the compress spring 160 may apply a frontward force from an M direction side of the long side 130 of the slide plate 110, while the band saw blade 15 applies a force in a rearward direction from an S direction of the long side 130 of the slide plate 110.

Additionally, the wheel support portion 21a may have applied forces balanced in a direction perpendicular to the forces of the compression spring 160 and band saw blade 15 (e.g., in the M-to-S direction). For example, the adjusting screw 21g may apply a force to the slide plate 110 (e.g., a force in the S direction being applied from the bottom surface of the second support 131 of the slide plate 110), and the pin 140 may apply a force to the slide plate 110 (e.g., a force in the M direction being applied from the top surface 130a of the long side 130 at a position nearer to the short side 120). These forces may be equal in magnitude but opposite in a direction, so as to be balanced in an axial direction of the wheel support shaft 21b (however, this may not be the case in certain embodiments). However, these two forces may be offset in the radial direction of the wheel support shaft 21b.

The offset forces of the compression spring 160 and the band saw blade 15 may apply a first rotational force to the wheel support portion 21a. The offset forces of the adjusting screw 21g and the pin 140 may apply a second rotational force to the wheel support portion 21a. These rotational forces may be balanced. Thus, the wheel support portion 21a may be prevented from being rotated. The balanced forces that suppress the rotation force may additional be produced by a minimal number of components. Furthermore, a bending force that might be produced in the slide plate 110 may be simple and deformation of the slide plate 110 might be small and simple. Thus an operation failure may not occur in the tension adjustment mechanism 100.

In some embodiments, the pin 140 may serve as a pivot point when the compression spring 160 is in a compressed state and/or the band saw blade 15 is in a tensioned state. As previously discussed, the forces of the compression spring 160 and the band saw blade 15 may be offset in a direction (e.g., a direction corresponding to the axial direction of the wheel support shaft 21b). Accordingly a first rotational force may be applied to the wheel support portion 21a. As depicted in FIG. 10, the pin 140 is positioned at an intermediate position between the short side 120 of the slide plate 110 and the portion of the long side 130 of the slide plate 110 connected to the wheel support shaft 21b. The pin 140 may also be positioned between the force supplied by the compression spring 160 and the force supplied by the band saw blade 15 (e.g., between in the M-to-S direction and/or in the direction corresponding to the axial direction of the wheel support shaft 21b). Based on this positioning and the relative forces being applied, the pin 140 may server as an intermediate support for the slide plate 110 and may serve as a pivot point about which the first rotational force is applied. A second or counter-rotational force may be applied to the slide plate 110, the counter-rotational force approximately equal in magnitude and opposite in direction to the first rotational force. The counter-rotational force may be applied to a portion of the slide plate 110 corresponding to the second support 131. For example, the adjustment screw 21g may provide the counter-rotational force to the slide plate 110 by providing a relative pressing force against the bottom surface of the slide plate 110. For instance, the adjustment screw 21g may provide a force so as to cause a counter-rotational force around the pin 140, so as to counteract (e.g., be equal in magnitude but opposite in direction) to the rotational force about the pin 140 caused by the forces of the compression spring 160 and band saw blade 15. Additionally, the rotational force received by the slide plate 110 by a combination of the compression spring 160 and the band saw blade 15 may be equal in magnitude but opposite in direction to the counter-rotational force applied to the slide plate 110 by the adjustment screw 21g. At least in part due to the balancing of these rotational forces, complex bending issues of the slide plate 110 may be reduce.

In some embodiments, one end of the long side 130 of the slide plate 110 may be attached to the saw wheel housing 20, while the opposite end of the long side 130 of the slide plate 110 may be unattached to the saw wheel housing 20. For example, an end of the long side 130 nearer the band saw blade 15 may be attached to the saw wheel housing 20 (e.g., via the pin 140), while an opposite end of the long side 130 further from the band saw blade 15 may be unattached to the saw wheel housing 20 (e.g., no component is holding a top surface 130a at the second support portion 131). As another example, one end of the long side 130 may be pinched towards the wheel housing 20, while the opposite end of the long side may not be pinched towards the wheel housing. As another example, when the compression spring 160 is in an uncompressed state and/or the band saw blade 15 is in an untensioned state, one end of the long side may have a force being applied to an upper surface 130a of the slide plate 110 (e.g., via the pin 140). However, the opposite end of the long side 130 may not have a force applied to the upper surface 130a of the slide plate 110 in this uncompressed and/or untensioned state.

In some embodiments, a securing element may traverse a substantial portion of an upper surface of the slide plate. For example, the pin 140 may traverse the upper surface 130a of the slide plate 110, such as in the direction perpendicular to the direction which the compression spring 160 provides a compressive force and/or a direction in which the slide plate 110 is primarily configured to slide. The pin 140 may also traverse the slide plate 110 in a direction substantially parallel to a wheel plane on which the saw wheel (e.g., front saw wheel 13) primarily rotates.

In some embodiments, lengths of the long side 130 of the slide plate 110 may be unequal with respect to the wheel support shaft 21b. For example, the portion (e.g., length from the wheel support shaft 21b to the end) of the long side 130 of the slide plate 110 closer to the short side 120 may be shorter than the portion (e.g., length from the wheel support shaft 21b to the end) of the long side 130 further from the short side 120. In some embodiments, the total lengths of the slide plate 110 may be equal with respect to the wheel support shaft 21b. For example, the total length of the portion of the slide plate 110 from the wheel support shaft 21b to the distal end of the short side 120 may be the same as the total length of the opposite portion of slide plate 110 from the wheel support shaft 21b to the distal end of the long portion 130 near the second support portion 131.

In some embodiments, the slide plate 110 may be essentially free of through holes. For instance, the only through hole present in the slide plate 110 may correspond to the position where the wheel support shaft 21b is attached to the slide plate 110. As another example, through holes may not be formed in the slide plate 110 in an area corresponding to the pin 140. As a further example, through holes may not be formed in the slide plate 110 in a portion of the long side 130 between the wheel support shaft 21b and the distal end of the long side 130 nearer the second support portion 131. As a result, the weakening effects that would be caused by such through holes may be avoided.

Furthermore, with regard to the force received by the short side 120 from the compression spring 160, the force may be produced by the compression and rattling of the spring 160 in the direction in which the wheel support shaft 21b primarily extends (e.g., in the M-to-S direction). The position where this force is produced and the position of the adjustment screw 21g may respectively serve as the first support 121 and the second support 131 positioned, which are positioned at each end of the slide plate 110. The pin 140 (which may serve as an intermediate support) may serve to concentrate the load. For example, the tension adjustment mechanism 100 may form a load balance similar to a beam both ends of which are free ends. For instance, the pin 140 may serve as the pivot point for this beam relationship, of which the first support 121 and the second support 131 serve as the free ends. Thus, while a maximum bending moment may be produced at the portion of the slide plate 110 that contacts the pin 140 (e.g., intermediate support), a bending force at both ends of the slide plate 110 may essentially be zero. Accordingly, an amount of bending deformation may be maximum at the portion of the slide plate 110 that contacts the pin 140 and the bending force may gradually decrease towards the tip ends and finally may be essentially zero at approximately both ends of the slide plate 110. Because of this configuration, an operation failure with regard to the slide plate 110 may not occur.

Figure 11:
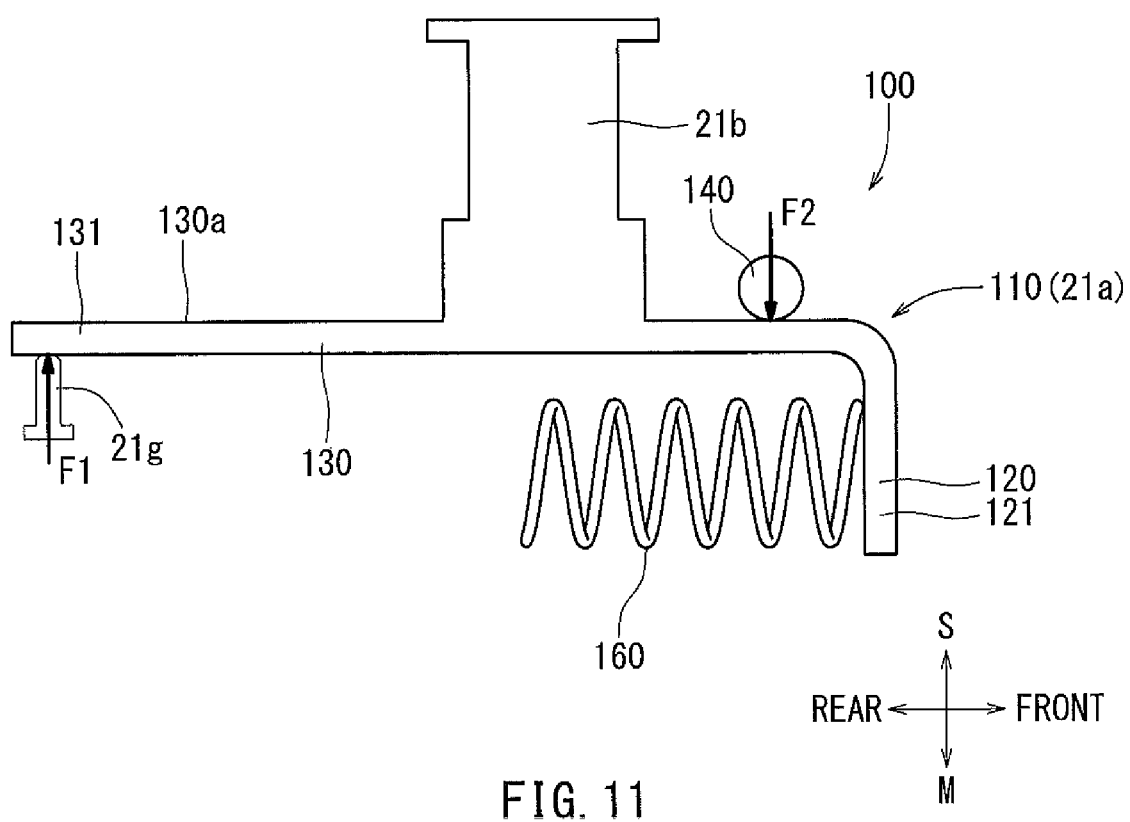
FIG. 11 is a schematic diagram of FIG. 10 showing a slide plate and its surroundings.
Figure 12:
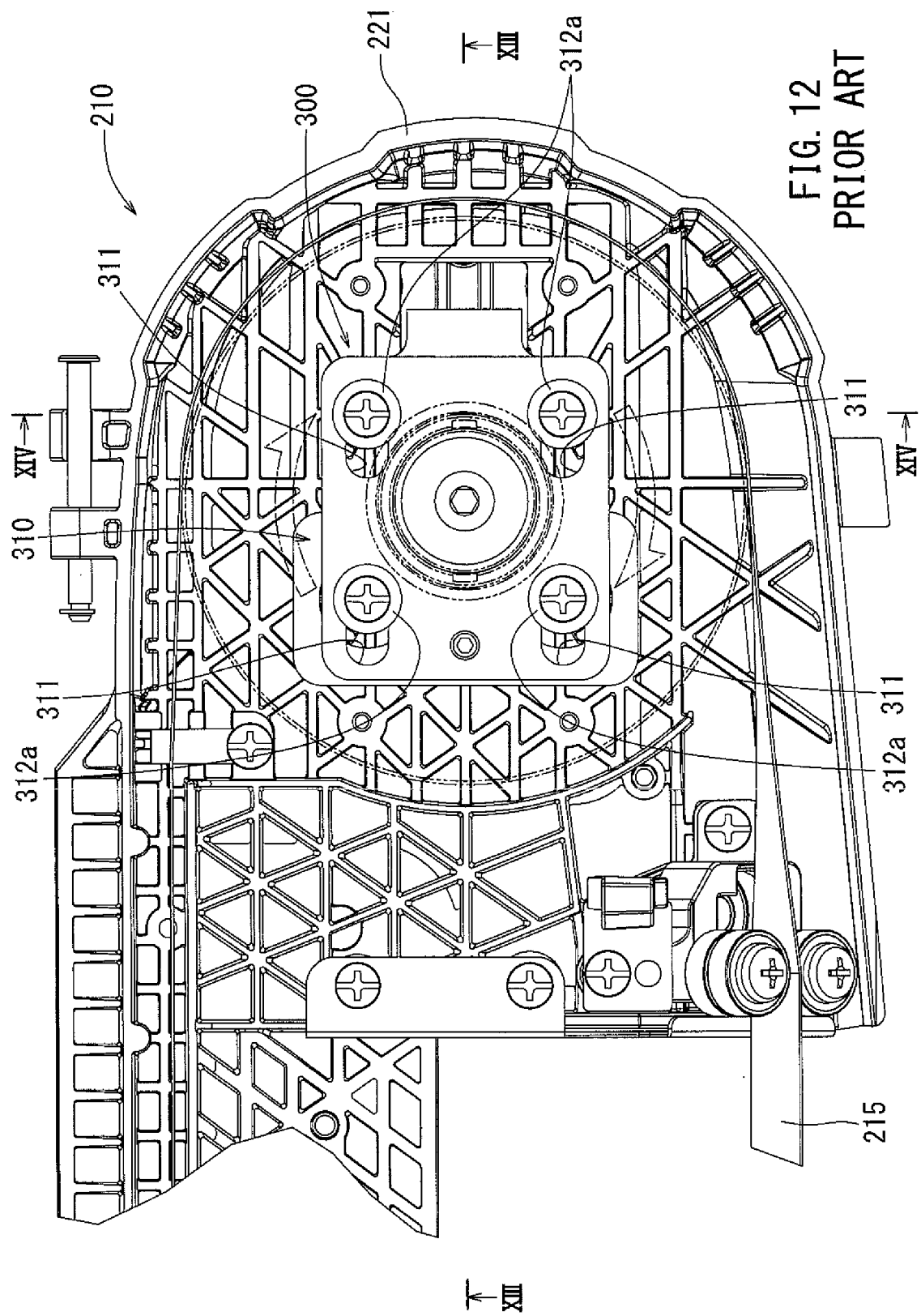
FIG. 12 is a conventional portable band saw in which a driven-side saw wheel is removed (the removed wheel is indicated by the two-dot line), showing that tension is not applied to a band saw blade by a tension load adjustment mechanism.
Figure 13:
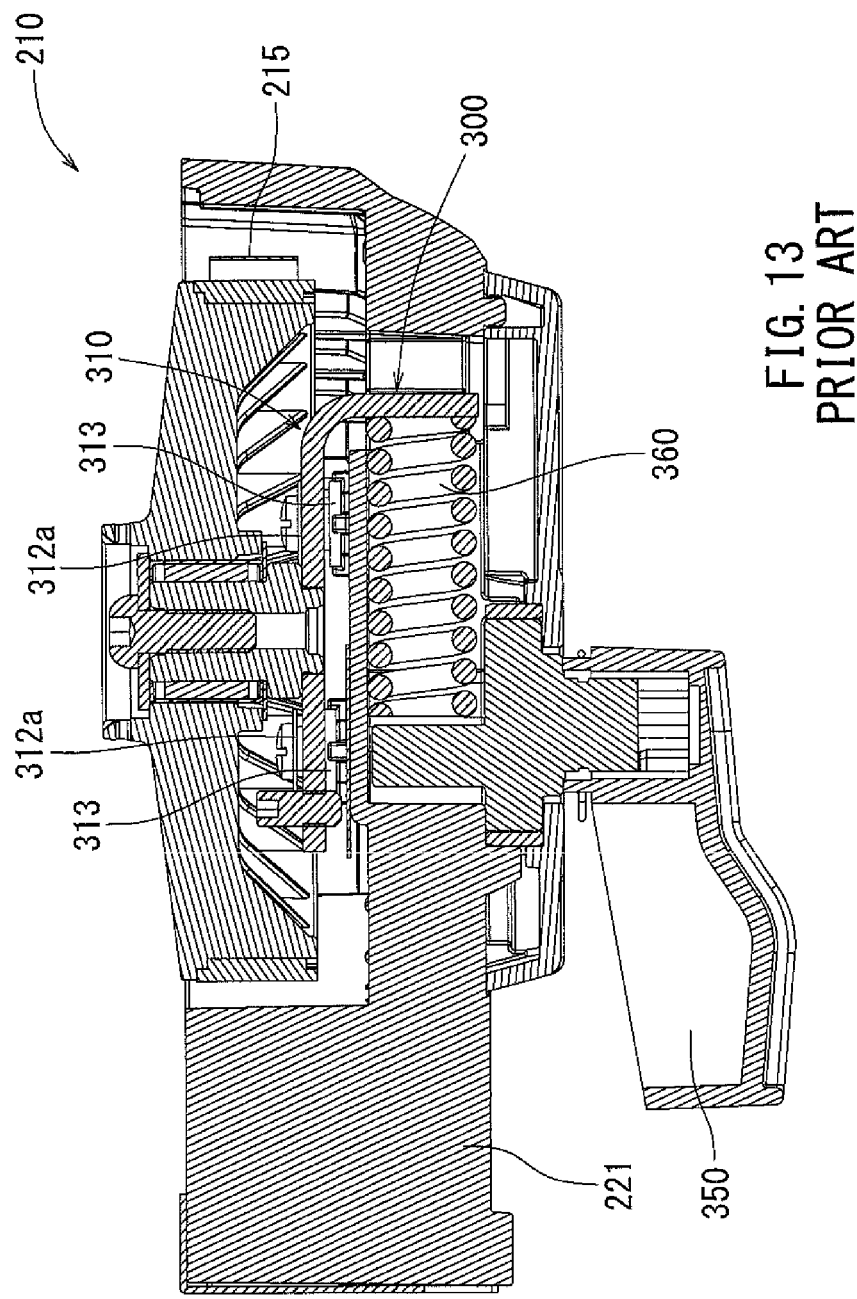
FIG. 13 is a cross-sectional view taken along line XIII-XIII of FIG. 12.
Figure 14:
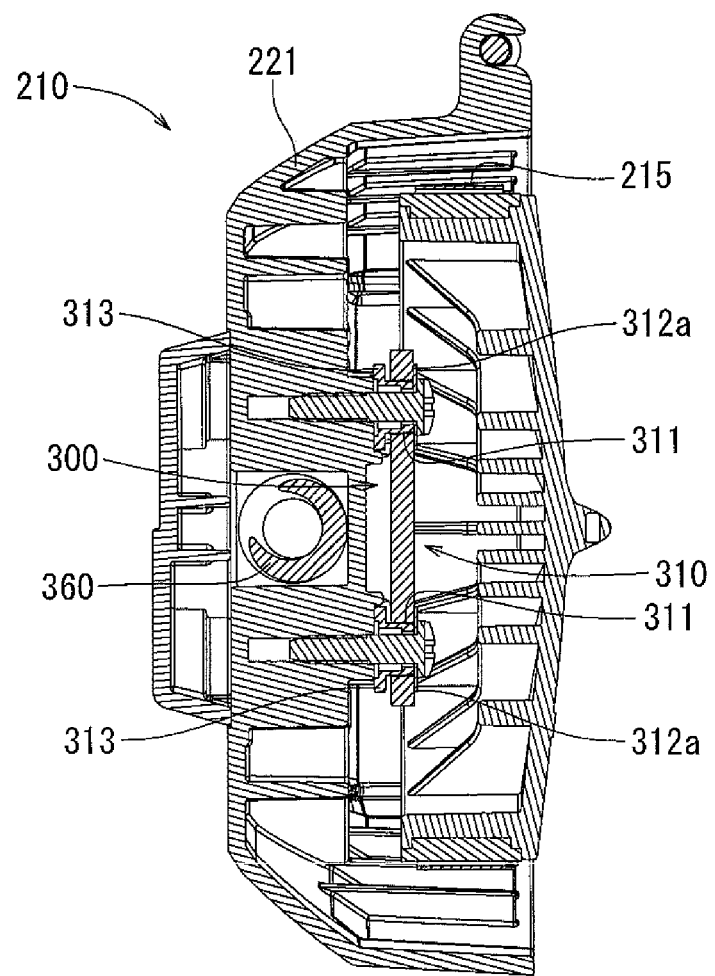
FIG. 14 is a cross-sectional view taken along line XIV-XIV of FIG. 12.

In FIG. 11, F1 shows a load (e.g., force) that the adjustment screw 21g applies to the slide plate 110, and F2 shows a load (e.g., force) that the pin 140 applies to the slide plate 110. These forces may be set to be equal and opposite in certain embodiments.

The portable band saw 10 according to the embodiments of the present disclosure may be configured as discussed above. According to the configuration in the above embodiments, a complex bending load may not be applied to the slide plate 110. As a result, distortion may not be generated in the slide plate 110 during its movement, and thus a failure may not occur in the tension adjustment mechanism 100.

Furthermore, according to the above configurations in the embodiments, the pin 140 may be positioned between the first support 121 and the wheel support shaft 21b. This means that the pin 140 (which may be an intermediate support) is disposed between the places where rotation forces occur. Thus, the pin 140 may serve as the rotation center. In addition, the maximum bending moment may be generated at the position of the pin 140. Because the position where the maximum bending moment is generated serves as the rotation center, an operation failure caused by bending distortion can be reduced.

Furthermore, according to the above configurations in the embodiments, the pin 140 may extend in the direction perpendicular to the sliding direction when viewed in the M direction. In addition, the pin 140 may be formed in a cylindrical shape and come into line-contact with the long side 130 of the slide plate 110. Because of this configuration, the contact resistance of the pin 140 with respect to the long side 130 of the slide plate 110 can be reduced. In this respect, the operation failure can be reliably prevented in the tension adjustment mechanism 100.

Furthermore, according to the above configurations in the embodiments, the contact area between the pin 140 and the slide plate 110 may be restricted to essentially a single line, which further reduces the contact resistance between these components.

Furthermore, according to the above configurations in the embodiments, the second support 131 may also serve as the fine adjustment mechanism. Because of this configuration, the inclination of the wheel support portion 21a may be fine adjusted, and thus the posture of the wheel support portion 21a may be held in a proper manner (e.g., proper tracking), which achieves the cutting task in a stable and proper manner. This may be further increased by the pin 140 serving as a stable rotation axis about which to incline the wheel.

Furthermore, according to the above configurations in the embodiments, the second support 131 may contact the adjustment screw 21g. By rotation of the adjustment screw 21g, the tip end of the rotated adjustment screw 21g may push the long side 130 of the slide plate 110. Because of this configuration, centering of the front saw wheel 13 that is assembled onto the slide plate 110 may be easily performed.

Furthermore, according to the above configurations in the embodiments, the ribs 21d may be formed in the front housing 21 so as to face each other such that each rib 21d holds the corresponding edge of the long side 130 of the slide plate 110 on the rear side in the K-to-L direction. Because of this configuration, the slide direction of the slide plate 110 may be essentially limited to the front-to-rear direction.

Furthermore, according to the above configurations in the embodiments, the slide direction of the slide plate 110 can be guided in an exact and easy manner by using the ribs 21d.

In the portable band saw 10 according to the above embodiments of the present disclosure, the configurations may not be limited to the above-discussed embodiments, and variations and modifications may be effected without departing from the spirit and scope of the present teachings. As a single example, the pin 140 may not be limited to the cylindrical shape, but any member may be adopted as long as the long side 130 of the slide plate 110 generally comes into line-contact with the pin 140.

What is claimed is:

1. A portable band saw with tension adjustment mechanism, comprising:
    a wheel support portion;
    a wheel support shaft fixed to the wheel support portion and extending in an axial direction;
    a first support at a first end of the wheel support portion;
    a second support at a second end of the wheel support portion, the second support being configured to receive a first load; and
    an intermediate support between the first support and the second support that contacts the wheel support portion, the intermediate support being between the first support and the wheel support shaft such that a longitudinal axis of the intermediate support traverses the wheel support portion in a direction perpendicular to the axial direction of the wheel support shaft and is configured to supply a second load to the wheel support portion; wherein:
    the wheel support portion is configured to be movable relative to the intermediate support in a radial direction of the wheel support shaft;
    the first load and second load are parallel to the axial direction of the wheel support shaft; and
    the direction of the first load is opposite to that of the second load.

2. The portable band saw according to claim 1, wherein the intermediate support extends in the direction perpendicular to the radial direction of the wheel support shaft.

3. The portable band saw according to claim 2, wherein the intermediate support has a cylindrical shape.

4. The portable band saw according to claim 2, wherein the intermediate support comes in line-contact with the wheel support portion.

5. The portable band saw according to claim 1, wherein a fine adjustment mechanism contacts the second support and is configured to provide the first load.

6. The portable band saw according to claim 5, wherein the fine adjustment mechanism is configured such that rotation of the fine adjustment mechanism increases or decreases the first load.

7. The portable band saw according to claim 1, further comprising guide members abutting opposing side surfaces of the wheel support portion.

8. The portable band saw according to claim 7, wherein the guide members are configured as ribs, each extending in the radial direction of the wheel support shaft.

9. The portable band saw according to claim 1, wherein;
    the wheel support portion has a flat plate shape including
        a first planar part extending in directions perpendicular to the axial direction of wheel support shaft; and
    the intermediate support slidably contacts the first planar part of the wheel support portion.

10. The portable band saw according to claim 9, wherein the wheel support portion further includes a second planar part extending in the axial direction of the wheel support shaft, the first and second planar parts forming an L-shape when viewed from a direction in which the intermediate support extends.

11. The portable band saw according to claim 10, wherein the first planar part includes the second end and the second planar part includes the first end.

12. The portable band saw according to claim 9, wherein the intermediate support slidably contacts an upper surface of the planar part of the wheel support portion from which the wheel support shaft extends in the axial direction and traverses the upper surface of the first planar part of the wheel support portion.

13. The portable band saw according to claim 12, wherein a length of the upper surface of the wheel support portion between the wheel support shaft and the first end is the same as a length of the upper surface of the wheel support portion between the wheel support shaft and the second end.

14. The portable band saw according to claim 1, wherein the intermediate support is fixed to a housing of the portable band saw using screws at both ends of the intermediate support.

15. The portable band saw according to claim 1, further comprising:
    a band saw blade providing a band-saw-blade load to the wheel support shaft primarily in the radial direction of the wheel support shaft when in a tension state; and
    a compression spring providing a compression-spring load to the first support primarily in a direction substantially parallel to the radial direction of the wheel support shaft when the compression spring is in a compressed state,
    wherein the band-saw-blade load and the compression-spring load provide a rotational force to the wheel support portion about the intermediate support.

16. The portable band saw according to claim 15, wherein the intermediate support is between the band-saw-blade load and the compression-spring load in the axial direction of the wheel support shaft.

17. The portable band saw according to claim 15, further comprising a lever provided with a cam, the cam is configured to compress the compression spring by rotation of the lever.

18. The portable band saw according to claim 15, wherein the first load provides a counter-rotational force to the wheel support portion about the intermediate support.

19. The portable band saw according to claim 18, wherein the rotational force and the counter-rotational force are equal in magnitude and opposite in direction.

20. The portable band saw according to claim 1, wherein the first load and the second load are applied to opposite surfaces of the wheel support portion.

* * * * *